455-616 AU 233 EX

EP3106 XR 3,722,982

United States Patent [19]

Brandt

[11] 3,722,982

[45] Mar. 27, 1973

[54] COHERENT OPTICAL PROCESSING METHOD AND SYSTEM HAVING IMPROVED SIGNAL-TO-NOISE RATIO UTILIZING POLARIZING FILTERS

[75] Inventor: Gerald B. Brandt, Pittsburgh, Pa.

[73] Assignee: Westinghouse Electric Corp., Pittsburgh, Pa.

[22] Filed: Oct. 26, 1971

[21] Appl. No.: 192,522

[52] U.S. Cl. ..................350/147, 250/199, 350/150, 350/157

[51] Int. Cl. ..........................G02b 27/28, H04b 9/00

[58] Field of Search..............350/147, 150, 157, 160; 250/199

[56] References Cited

UNITED STATES PATENTS 3,465,156 9/1969 Peters..................................250/199

*Primary Examiner*—David Schonberg
*Assistant Examiner*—Paul R. Miller
*Attorney*—F. H. Henson

[57] ABSTRACT

A coherent optical processing method and system for improving signal to noise ratio. A coherent optical beam which can be polarized or unpolarized is split into two component beams which are then polarized to two separate orthogonal states of polarization. Each component beam is operated upon to impart information thereto or sent through a transmission channel during which operation and transmission a small portion of each component beam is unavoidably scattered and depolarized. Each component beam is thereafter optically filtered with a polarizer aligned with the polarization state of each component beam, thereby removing approximately half of the depolarized noise portions of each component beam. The filtered component beams are then recombined, forming a polarized beam with a noise component depolarized with respect to the polarization beam. The combined polarized beam is again filtered in a polarizer aligned with the polarization state of the combined beam to reduce the depolarized noise portion again by about half. The resultant polarized beam has a signal to noise enhancement of about four by the inventive system.

12 Claims, 9 Drawing Figures

COHERENT OPTICAL PROCESSING METHOD AND SYSTEM HAVING IMPROVED SIGNAL-TO-NOISE RATIO UTILIZING POLARIZING FILTERS

BACKGROUND OF THE INVENTION

1. Field of the Invention

This invention relates to processing of optical beams containing information. In ones of its aspects, the invention relates to a system and method for processing information in which noise unavoidably created in modulating and/or transmitting optical polarized beams is filtered by a series of polarizers so that the signal to noise ratio is enhanced by a factor in excess of two.

2. State of the Prior Art

In optical processing systems, coherent polarized optical beams, such as laser beams, are modulated and transmitted through air or water to be decoded for further use of the information at a receiving station. Stationary scatterers in the modulating apparatus and in the transmitting medium unavoidably scatter and depolarize a small portion of the polarized beam. It is desirable to remove or to diminish the depolarized noise component of the information transmitting beam so that the information transmitting beam so that the information signal on the beam can be more easily decoded. It is known that the depolarized noise component in the beam can be reduced by about half by passing the transmitted beam through a polarizer aligned with the polarization state of the signal component. However, the noise component is thereby polarized in the same state as the signal in equal proportion to that of the noise component. Further filtering of this nature has heretofore been unable to improve the signal to noise ratio.

Other more sophisticated filtering techniques, such as multichannel spatial filtering, have also been devised. These techniques, while effective to some extent, do not have the simplicity and the low cost of polarization filtering.

BRIEF STATEMENT OF THE INVENTION

The invention of this application provides a simplified polarization filtering system and method wherein the signal to noise ratio can be increased by a factor in excess of two. A coherent optical beam is split into two or more component beams and each component is polarized so that the polarization axis or state of each beam is different. Each component beam is then operated upon in an identical manner to impose information to the component beams or is transmitted through a suitable medium. During the course of the operation, a portion of each component beam is unavoidably scattered and depolarized so that each component beam has a depolarized noise portion. Each component beam is then filtered with a polarizer aligned with the polarization state of the particular component beam to remove about one-half of the noise signal from each component beam. At least two of the components are then recombined and the combined beam is again filtered in a polarizer aligned with the polarization state of the combined signal beam. Since the noise portions of the component beams are noncoherent, their combination produces a depolarized noise signal, or a noise signal polarized with respect to the signal beam. Thus, the second polarization filtering again reduces the noise by two, thereby improving the overall signal to noise ratio for the combined beam by about four.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
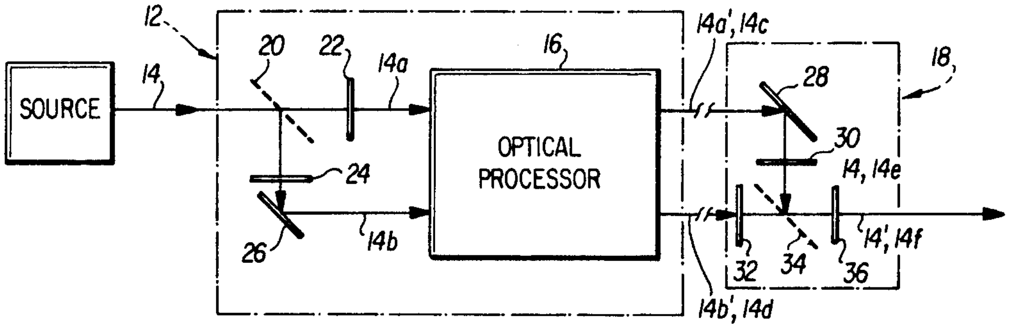
FIG. 1 is a schematic representation of an optical system according to the invention.

Referring now to the drawings and to FIGS. 1 through 8 in particular, there is illustrated an optical system in which the signal to noise ratio for th optical beam is materially enhanced. A coherent polarized optical beam 14 is transmitted to an optical transmitting station 12 from a suitable source such as a laser beam generator. It is common practice to use a monochromatic coherent polarized beam. The optical beam is split and passes through the optical transmitting station 12 which can include an optical processor 16. The split beam is emitted from the transmitting station and received by receiver 18 which may be spaced some distance from the transmitter 16. The receiver 18 then decodes the information on the beam.

Figure 2:
FIGS. 2 through 8 are schematic representations of the polarization states of the optical beams at various points throughout the optical system illustrated in FIG. 1.
Figure 3:
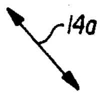

According to the invention, the optical polarized beam 14 whose polarization is represented in FIG. 2 is split into two portions by a first beam splitter 20 such as a partial mirror. A first beam component passes through the mirror and through a polarizer 22 having its optical axis at an acute angle to the axis of the polarized beam. Thus, the first component of the beam 14 emerges from the polarizer 22 as a polarized beam **14*a* whose axis is angularly displaced in one direction from the polarization axis of the beam 14**, as illustrated in FIG. 3. For purposes of simplicity, the polarized beams will be illustrated as being linearly polarized. It is obvious that other orthogonal states of polarization such as right and left circular or elliptical can also be used.

Figure 4:
Figure 5:
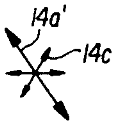
Figure 6:
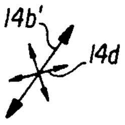

The second component of the input beam 14 is reflected from the mirror and passed through a polarizer 24 having an axis also at an acute angle but opposite in direction to the axis of the input beam 14. Emerging from the polarizer 24 is a polarized beam **14*b* having an axis of orientation angularly disposed with respect to the axis of the input beam 14 as illustrated in FIG. 4. Preferably, the angular relationship between the polarizers 22 and 24 is 90°, with the axis of the input beam 14 bisecting the angle between the axis of polarization of the polarizers 22 and 24. The beam 14*b* is then reflected from a mirror 26 so that it is parallel to the first beam component 14*a*. The beam components 14*a* and 14*b* are passed through an optical processor 16 which imparts a signal to the beam components 14*a* and 14*b*. The optical processor 16 can be any suitable well known modulator or other similar device which imparts information to the optical beam. However, during the course of optical processing in the processor 16, a portion of the polarized beam is unavoidably scattered and depolarized resulting in a beam 14_a'_ having a depolarized component 14_c_ (FIG. 5) as would result from stationary scatterers. In the case of time varying scatterers as would be present in underwater communications, for example, the noise signal would have a polarization axis which varies randomly with time. Likewise, a portion of the second component 14b is scattered and depolarized and the second component 14_b'_ emerging from the processor 16 has a depolarized noise component 14_b_ (FIG. 6**).

The beam components 14_a'_ and 14_b'_, along with their respective noise components 14_c_ and 14_d_, are transmitted to the receiving station 18 through a suitable channel. During the transmission of the beam, additional scattering and depolarization of the polarized beams 14_a'_ and 14_b'_ can take place.

The first beam component 14_a'_ is reflected from a mirror 28 and passed through a polarizer 30 whose orientation axis is aligned with the orientation of the first beam component 14_a'_. Because of the random nature of the depolarized noise components, about one-half of noise signal energy is filtered by polarizer 30.

Figure 7:
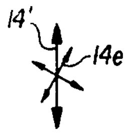
Figure 8:
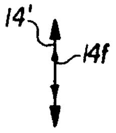

In a similar manner, the second beam component 14_b'_ is passed through a polarizer 32 having its axis aligned with the polarization axis of the beam 14_b'_, thereby filtering out approximately one-half of the noise energy 14_d_. The first and second beam components are thereafter combined with a second beam splitter 34 such as a partial mirror to produce and output beam having a polarized signal component 14' identical with that of the input beam 14. The filtered noise components remaining with the beam components 14_a'_ and 14_b'_ are also combined. However, the noise components are non-coherent and their combination produces a depolarized component and/or a polarized noise component whose axis of polarization is different from that of the output beam 14'. The combined beam is illustrated in FIG. 7 with 14_e_ representing the depolarized noise component. The combined beam is then passed through a polarizer 36 having an axis of orientation identical with that of the output beam 14, thereby filtering out once again about one half of the depolarized noise energy. This filter 36 reduces the noise by a factor of about two while the polarized signal beam 14' is not affected. The output beam having a polarized beam 14' and a polarized noise component 14_f_ is illustrated in FIG. 8.

From the foregoing it can be seen that the noise component of the beam is effectively reduced twice, each time by a factor of about two. The first noise reduction takes place in polarizers 30 and 32, and the second in polarizer 36. The intensity of the signal beam, however, is not diminished in these polarizers. Accordingly, by the inventive system, there is an enhancement in the signal to noise ratio of about 4:1.

Figure 9:
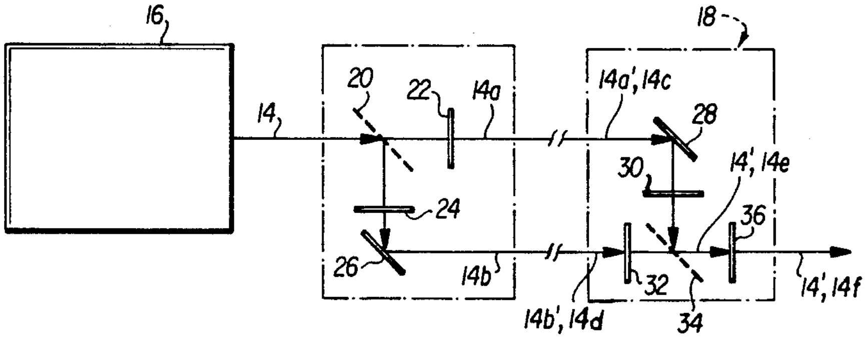
FIG. 9 is a schematic representation of a second embodiment of the invention.

Reference is now made to FIG. 9 which illustrates a second embodiment of the invention. In this embodiment, like numerals have been used to designate like parts. An optical processor 16 emits a coherent polarized beam 14 which may also have a depolarized noise component. The beam is split and a first beam component is passed through polarizer 22 whose axis is angularly displaced with respect to the axis of polarization of beam 14, thereby forming a component 14_a_. A second beam component 14_b_ is passed through polarizer 24 which has an angle of orientation rotated in an opposite direction compared to polarizer 22 with respect to the polarization axis of beam 14, thereby producing a beam component 14_b_ whose axis of orientation is angularly disposed to the orientation of the beam 14. The beam components 14_a_ and 14_b_ are then transmitted through a signal channel such as air or water to a receiver 18. During the transmission, part of the beams 14_a_ and 14_b_ are scattered and depolarized, thereby introducing noise components 14_c_ and 14_d_ onto the beam components 14_a'_ and 14_b'_. The beam component 14_a'_ and the noise signal 14_c_ are reflected by mirror 28 and passed through polarizer 30 adapted to pass the signal beam component 14_a'_, thereby filtering out one-half of the noise signal 14_c_. Likewise, the second beam component 14_b_ and noise signal 14_d_ are passed through polarizer 32 which is oriented to pass the signal component 14_b'_, thereby filtering out one-half of the noise component 14_d_. The filtered beam components 14_a'_ and 14_b'_ are combined by a beam splitter 34 and the combined beam is then passed through polarizer 36 which is oriented to pass the signal 14'. The combination of components 14_a'_ and 14_b'_ results in a coherent polarized beam 14' identical to the original beam. Because of the non-coherent nature of the filtered noise signals 14_c_ and 14_d_, the combined noise signals form a deoriented noise signal 14_e_, or a noise signal whose axis of polarization is different than that of beam 14'. The noise signal 14_e_ is reduced again by one half by the filter 36 which results in a filtered noise signal 14_f_ and a polarized coherent signal beam 14'. The beam 14 can then be further processed according to known processing methods for decoding the information imparted on the beam 14' and utilizing the decoded information.

The angles between the polarized beam 14 and the axis of the polarizers 22 and 24 are preferably complementary to maximize the intensity of the resulting beam after the two components are recombined. Preferably, the angles between the axis of the input beam 14 and the axes of polarizers 22 and 24 are 45° so that beam components 14_a_ and 14_b_ each have an intensity of about one-fourth of the input beam 14.

The invention has been described with reference to a system in which the input beam is to split into two components. However, the beam can be split into three or more components and processed in the same manner. When the beam is split into multiple components, the noise can be additionally filtered by multichannel spatial filtering techniques and then recombined for polarization filtering as described above. So long as the beams are polarized, combined and again polarized, the signal to noise enhancement will always be a factor of four.

The drawings have been described with reference to linear states of polarization. However, any orthogonal state of polarization, i.e., elliptically or circularly polarized light can be employed.

In addition, the invention has been described with reference to beam splitters 20 and 34 being conventional partial mirrors. In lieu of the mirrored beam splitters, Wollaston prisms can be employed to increase the efficiency of the system.

Reasonable variation and modification are possible within the scope of the foregoing disclosure, the drawings, and the appended claims without departing from the spirit of the invention.

What is claimed is:

1. A method of optically processing a coherent polarized optical beam to enhance signal to noise ratio, said method comprising:

separating said coherent polarized beam into at least two component beams whose polarization states are angularly disposed with respect to each other;

processing each of said component beams and thereby unavoidably scattering and depolarizing a portion of each of said component beams;

optically filtering each of said component beams with polarizers aligned with the polarization states of said component beams to filter said scattered and depolarized portions of each of said component beams;

recombining said filtered component beams into a coherent polarized beam having a depolarized noise portion; and optically filtering said recombined polarized beam with a polarizer aligned with the polarization state of said recombined polarized beam to further filter and depolarize said noise portion.

2. A method of optically processing a coherent polarized optical beam according to claim 1 wherein the polarization state of each of said component beams is angularly disposed with respect to the polarization state of said coherent polarized optical beam.

3. A method of optically processing a coherent polarized optical beam according to claim 2 wherein the angle between the polarization states of said component beams is about 90°.

4. A method of optically processing a coherent polarized optical beam according to claim 1 wherein equal angles are made between the polarization state of each component beam and the polarization state of said coherent polarized beam.

5. A method of optically processing a coherent polarized optical beam according to claim 1 wherein said processing step includes modulating each of said component beams in an identical manner.

6. A method of optically processing a coherent polarized optical beam according to claim 1 wherein said processing step includes transmitting each of said beam components through an identical transmission channel.

7. A method of optically processing a coherent optical beam to enhance signal to noise ratio, said method comprising:

separating said optical beam into at least two component beams;

polarizing each of said beams so that the polarization state of one of said component beams is angularly disposed with respect to the other;

processing each of said component beams and thereby unavoidably scattering and depolarizing a portion of each of said component beams;

optically filtering each of said component beams with a polarizer aligned with the polarization state of each of said component beams to filter said scattered and depolarized portions of each of said component beams;

recombining said filtered component beams into a coherent polarized beam having a depolarized noise portion; and optically filtering said recombined polarized beam with a polarizer aligned with the polarization state of said recombined polarized beam to further filter said depolarized noise portion.

8. A system for processing a coherent optical beam comprising:

means for separating an optical beam into two component beams having separate states of polarization;

means for processing said component beams and thereby unavoidably scattering and depolarizing a portion of each of said component beams;

first polarizing means for receiving said two component beams and respectively aligned with the polarization state of each thereof for passing said component beams and optically filtering said depolarized portions thereof;

means optically associated with said first polarizing means for recombining said filtered component beams, and producing a coherent polarized beam with a depolarized noise portion thereof; and second polarization means optically associated with said recombining means and aligned with the polarization state of said combined beam to optically filter said depolarized portion of said recombined beam, whereby the signal to noise ratio of said optical beam is enhanced by a factor of about four.

9. A system for processing a coherent optical beam according to claim 8 wherein said optical beam is polarized.

10. A system for processing a coherent optical beam according to claim 9 wherein said processing means includes a modulator.

11. A system for processing a coherent optical beam according to claim 9 wherein said processing means includes an optical transmission means.

12. A system for processing a coherent optical beam according to claim 9 wherein said orthogonal states of polarization are disposed substantially 90° with respect to each other.

* * * * *